June 26, 1962 W. M. BOOTH 3,041,212
EGG WASHING APPARATUS AND METHOD
Filed Oct. 27, 1958

INVENTOR.
WILLIAM M. BOOTH
BY Price and Heneveld
ATTORNEYS 3,041,212
EGG WASHING APPARATUS AND METHOD
William M. Booth, Grand Haven, Mich., assignor to Welded Products Company, Grand Haven, Mich., a corporation of Michigan
Filed Oct. 27, 1958, Ser. No. 769,609
8 Claims. (Cl. 134—21)

This invention relates to an egg washing apparatus and method. More particularly, it relates to an egg washing apparatus and method wherein eggs are washed without ever being submerged in the cleaning solution.

Egg washing machines that have heretofore been developed have been constructed and operated so that the eggs being cleaned are wholly or partly submerged in the wash liquid at least at the end of the wash cycle. This is a definite disadvantage because the debris and soil to be removed from the eggs by the washing operation will frequently be found floating on the surface of the wash liquid. Much of the floatable debris and soil will be present at the end of the wash operation in the form of a scum. Moreover, a substantial proportion of the debris and soil will remain in suspension in the wash liquid. When the eggs are removed from the egg washing machines of the prior art, a considerable amount of re-deposition of the debris and soil takes place. This is true even if the eggs are swirled in the pool of wash liquid while being removed. This is especially true in the case of those machines adapted and operated to wash a nest or cluster of eggs in a basket, the outside portion of the cluster acting as a crude filter with respect to solution containing debris and soil inside the cluster. While the eggs washed in the prior art machines and by the prior art methods are substantially cleaner than unwashed eggs, nevertheless, the residual debris and soil re-deposited upon the eggs is highly objectionable and a source of great annoyance.

Another disadvantage of the prior art machines and methods for washing eggs resides in the fact that the eggs can not be drained in the egg washing machine without completely removing the wash liquid from the egg washing machine. Yet, the wash liquid may have considerable cleaning potential left, especially when it is an aqueous solution of a detergent-germicide composition. Considering that these machines are usually employed in large scale operations, it will be appreciated that to dump the wash liquid and to refill the machine results in considerable down time of the machine as well as expense in lost detergent-germicide and labor. This is even more serious in those cases where the wash solution is established and maintained at a temperature in the range of 110° to 120° F. to expand the egg contents and seal the egg shell pores or voids during the wash operation. This sealing effect tends to minimize bacterial entry into the eggs during the washing process and subsequent storage. In this heat sealing method, the allowable time of exposure of the egg to the warm wash liquid is approximately three to five minutes. If this time period is exceeded, egg spoilage is likely to result due to precooking. Consequently, the wash cycle in this type of operation is quick. To dump the wash liquid at the end of the cycle, refill the machine and adjust the wash liquid temperature for heat sealing is impractical. Therefore, it is common practice to either lift the eggs out of the wash liquid and hold the same over the machine until drainage is substantially complete, thereby being a source of annoyance to the operator as well as consuming a substantial amount of time or, more commonly, the eggs are permitted to drip over the machine and on the floor, thereby resulting in an unsanitary condition and an unsafe working condition from a possibly slippery floor.

Still other serious disadvantages of the prior art egg washing machines reside in the ways and means for moving wash liquid with respect to the eggs. Heretofore, prior art machines have been provided with a rotatable turntable on which is placed a perforate container, such as, for example, a wire basket, with a cluster of eggs therein. Spray means are provided for directing a plurality of sprays of wash liquid through the wash liquid bath tangentially to the container. Under operative conditions the sprays cause the container and the turntable to rotate in the wash liquid bath. The bath also tends to rotate. As a result, wash liquid inside the cluster tends to assume the same velocity of rotation as the cluster of eggs and there is substantially no relative movement of wash liquid past the eggs inside the cluster. Hence, cleaning action inside the cluster is quite poor in such machines. Other prior art machines have been developed wherein the container for the eggs rests on a stationary support inside a vertical, cylindrical baffle within a wash tank. At the bottom of the baffle there is provided a downflow passageway with a down draft impeller. Under operative conditions wash liquid is pulled down from inside the baffle through the passageway and then impelled up between the tank wall and baffle to the top of the baffle whereat it flows over the baffle and down inside it. This type of operation involves a forced vortex type flow of wash liquid. As a result, relative movement of wash liquid past eggs along the center line of the baffle is quite poor in such machines. In both types of these prior art machines, relative movement of wash liquid and eggs is additionally impeded and non-uniform because of the fact that the cluster of eggs is submerged in the wash liquid.

A general object of this invention, therefore, is to develop ways and means for washing eggs in which re-deposition of debris and soil in the wash solution is avoided.

Another object of this invention is to provide an egg washing machine and method for egg washing wherein the eggs may be drained substantially dry before removal from the egg washing machine.

A specific object of this invention is to provide an egg washing machine that functions to wash eggs without submergence of the same in the wash liquid at any time during the washing operation.

Another specific object of this invention is to provide an egg washing machine in which there is no relatively static wash liquid inside the cluster of eggs during the washing operation.

Still another specific object of this invention is to provide an egg washing machine in which there is a large and substantially uniform volume flow rate of wash liquid past each and every egg in the cluster.

Another object of this invention is to provide an egg washing machine that can be readily cleaned following the operation thereof.

Still another object of this invention is to develop an egg washing machine which is completely self-contained.

A further object of this invention is to provide an egg washing machine that is fool-proof in operation, which can be operated by unskilled personnel, and which is completely automatic in operation.

These and other objects which may appear as this specification proceeds are achieved by this invention which shall be described with reference to the drawings wherein.

Figure 1:
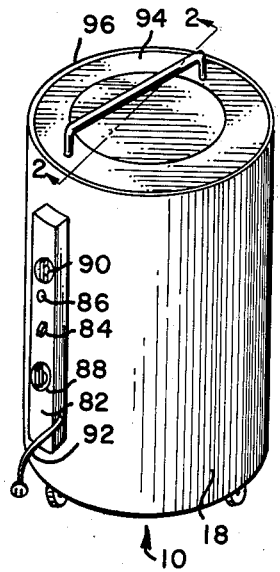
FIG. 1 is a perspective view of a preferred embodiment of the egg washing machine of this invention.

In general, the drawings disclose an egg washing machine comprising a tank having a bottom and a side wall. Between the top and bottom of the tank are provided means for supporting a perforate container for a cluster of eggs. The space below said means comprises a wash liquid reservoir while the space above said means comprises an egg washing compartment. Means are provided for withdrawing wash liquid from said reservoir and for introducing the same into the upper portion of the egg washing compartment into and over the perforate container in a plurality of inwardly extending sheet-like streams. Preferably, means are also provided for withdrawing wash liquid from said reservoir and for introducing the same into said egg washing compartment in a plurality of jet streams directed sidewise to said container. Included in the machine are filter screen means for removing debris and soil from the wash liquid before it is introduced into the egg washing compartment.

The drawings also disclose means for inducing egg sealing during the washing operation. In one aspect of this invention, such means reduce the ambient atmospheric pressure in the egg washing compartment. This aspect is based upon the concept that a reduction of atmospheric pressure upon each egg will cause the egg contents thereof to expand and seal the egg shell pores or voids.

From a method point of view, this invention broadly comprises the steps of contacting a cluster of eggs in a chamber with a downflowing wash liquid and removing wash liquid from the bottom of said space before it collects therein. Preferably, the wash liquid is introduced as sheets of liquid over the top of the cluster. In addition, wash liquid may be introduced as jet-like sprays sidewise into the cluster. In one aspect of this invention, there is involved the concept of sealing the egg shell pores by lowering the atmospheric pressure in the egg washing chamber.

*Structure*

In somewhat greater detail, it will be observed that the drawings disclose an egg washing apparatus 10 which comprises a tank 11 having an upper egg washing compartment 12 and a lower wash liquid reservoir compartment 14 with a downflow passageway 16 in between. The tank 11 comprises a cylindrical side wall 18 and a bottom 20. Between the top and bottom of the tank 11 and joined to the side wall 18 is an annular partition member 22. The partition member 22 separates the egg washing compartment 12 from the wash liquid reservoir compartment 14. The opening at the center of the partition member 22 provides the downflow passageway 16.

The upper wash compartment 12 is provided with an inner shell 23 having an axis of revolution which coincides with the axis of the side wall 18. The inner shell comprises a cylindrical member 24. The member 24 has an outside diameter less than the inside diameter of the side wall 18 whereby an annular space is provided between the side wall 18 and the inner shell 24. This annular space provides an upflow passageway 26 or manifold for wash liquid. At the bottom of the cylindrical member 24 is an inwardly extending, downwardly sloped annular shelf member 28 which terminates in a downwardly extending ring member 30. Ring member 30 is joined to the partition member 22 adjacent to but spaced from the inside end thereof at the downflow passageway 16. The annular portion of the partition member 22 between the ring member 30 and the inner end thereof forms an annular ledge 32. Joined to the top end of the inner shell 23 is a transversely disposed, annular closure member 34 which is secured to the side wall 18. While the inner shell 23 is shown in the drawings as being an integral part of the machine, it is also within the concept of this invention for the inner shell 23 to be removably secured to the partition member 22 and to the top closure member 34 or through the top closure member 34 to the side wall 18 as by suitable gaskets and fastening means. This structure is of advantage in that it facilitates periodic removal of the inner shell 23 for scale removal and cleaning, which might be necessary when the machine 10 is used in hard water regions.

Figure 3:
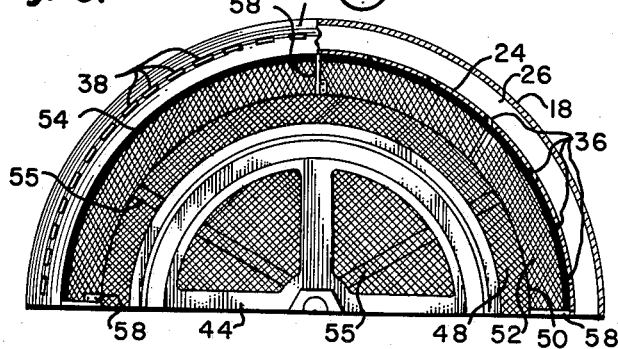
FIG. 3 is a plan, sectional view taken along the line 3—3 of FIG. 2 with the egg basket removed.

The cylindrical member 24, it will be observed, is provided with a plurality of orifices 36. Preferably, the orifices are arranged in rows with the rows parallel to the axis of the shell. A number of the orifices 36, it will be observed in FIG. 3, are angularly disposed through the cylindrical member 24 in the same circular direction. Preferably, the angle between the center line of the orifice and a line tangent to the circular periphery at the orifice is in a range of from about 20° to about 70°. All of the orifices 36 function under normal operative conditions to introduce cleaning liquid into the wash compartment 12 in the form of a plurality of jets or sprays which impinge laterally upon the egg cluster centered within the wash compartment 12. The orifices 36 are preferably arranged to obtain as completely as possible a lateral coverage of the egg cluster by the wash liquid. In this regard, it should be noted that the number of orifices and their arrangement about the cylinder 24 are dependent upon local conditions and in light of the description herein can be readily ascertained by those of ordinary skill in the art.

The annular closure member 34 at the top end of the inner shell 23 comprises a plurality of slit-like apertures 38. Preferably these apertures 38 are spaced uniformly around the annular closure member. These apertures 38 function to release cleaning liquid under pressure into the wash compartment 12 in a plurality of sheets of cleaning liquid. Above the apertures 38 and at the top end of the side wall 18 is an inwardly extending, downwardly sloped, annular baffle member 40 which may be an integral part of the side wall 18. This baffle 40 functions under normal operative conditions to deflect the plurality of sheets of cleaning liquid from the apertures 38 downwardly towards the central portions of the wash compartment 12 and to provide thereby optimum wash liquid distribution throughout the top area of the egg cluster in the wash compartment 12.

Centrally mounted over the downflow passageway 16 and the bottom portion of the wash compartment 12 is a combination pedestal and filter screen assembly 42.

The pedestal portion of the assembly 42 comprises a turntable 44 with its axis of rotation coaxially aligned with the axis of the wash compartment 12. The turntable is secured to a rotatable shaft which is removably seated in a shaft bearing assembly 45. Secured to the shaft bearing assembly 45 are radially extending, horizontally disposed, flat braces 55 which have downwardly extending leg members 56 which rest on the annular ledge 32. The braces 55 are also provided with vertically disposed gussets 57 for added structural strength. The turntable 44 functions to support an egg basket 60 in the wash compartment 12.

The filter screen portion of the assembly comprises a filter screen 46. The filter screen 46 comprises a central circular portion 48 which is underneath the turntable 44 and which rests on the flat braces 55. At the circumferential periphery of the central portion 48 there is provided a downwardly extending, generally cylindrical portion 50 joined to a generally horizontal, annular portion 52. This generally horizontal, annular portion 52 is intended to extend over the annular shelf 28. Consequently, in the embodiment shown in FIG. 2, the area of the annular portion 52 over the shelf 28 is upwardly inclined at about the same angle as the shelf 28. At the circumferential periphery of the annular portion 52 there is provided a gasket 54 which rests on the annular shelf at its juncture to the inner shell 24. The gasket 54 functions to prevent filterable debris and soil from being carried by wash liquid around the end of the screen 46 under normal operative conditions. It also functions in cooperation with the legs 56 and the cylindrical portion 50 to spacedly set apart the annular portion 52 of the screen 46 from the annular shelf 28 so that the annular portion 52 is an effective filter screen area.

It will be observed that the annular outer portion 52 of the filter screen 46 is provided with upwardly extending vanes 58. These vanes 58 function to prevent swirling of wash liquid on top of the screen portion 52 and to enhance passage of wash liquid through said screen portion under normal operative conditions.

It will also be observed that the filter screen and pedestal assembly 42 can be readily removed from the wash compartment 12 for cleaning.

The egg washer 10 as shown in the drawings comprises a third, auxiliary or utility compartment 62 below the wash liquid reservoir compartment 14. The utility compartment 62 is formed by the downward extension of the side wall 18. It is provided with a vented bottom member 64. In the auxiliary compartment 62 there is provided a pump 66 associated with a prime mover 68. At the bottom of the wash liquid reservoir compartment 14 there is provided a discharge outlet in combination with a conduit 70 which leads to the suction side of the pump 66. A conduit 72 is provided which runs from the discharge or pressure side of the pump 66 to the upflow passageway 26. Also provided at the bottom of the conduit 72 is a drain conduit 74 with a valve 75, which may be used to discharge wash liquid from the egg washer 10 either with or without the pump 66 in operation.

The wash liquid reservoir compartment 14 is provided with a heating coil 76 and a thermostat capillary 78, which are associated with a temperature control unit 80. This unit may be located as shown in the auxiliary compartment 62 or in a lateral control panel 82 mounted on the outside of the side wall 18.

The control panel 82 is provided with an on-off switch 84, an electrical pilot light 86, a timer mechanism dial switch 88, a temperature control dial switch 90, and various electrical leads to the operating units in the auxiliary compartment 62. The control panel is also provided with a three wire extension cord 92 with a plug for connecting the same to a suitable three wire source of electirc current. The third wire functions to ground the machine 10. Preferably, the electrical hook-up within the control panel 82 is such that with the on-off switch in "on" position, electrical current is supplied to the heating coil 76 from the control unit 80 until such time as the temperature of the wash liquid in the wash liquid reservoir compartment 14 has reached the temperature indicated by the temperature control dial switch 90. At that time, the current will be automatically shut off until the temperature of the wash liquid has receded to a point below that indicated by the dial switch 90, whereupon current is then turned on. Whenever electrical current is supplied to the heating coil 76, the pilot light 86 will be lit; with no current flow to the heating coil 76, the light 86 will be unlit. By turning the timer dial switch 88 to a desired time for the wash cycle, electrical current is supplied to the prime mover 68. When the timer mechanism returns the dial switch 88 to the "off" position or when the dial switch 88 is manually turned to the "off" position, electrical current to the prime mover 68 is shut off. Other electrical arrangements of these components are possible and can be readily arranged by those skilled in the art.

As shown, the combination of the temperature control unit 80 and the heating coil 76 is adapted to heat the wash liquid in the wash liquid reservoir compartment 14 to a temperature as high as about 120° F. in order to heat-seal eggs being washed in the machine 10. However, the temperature control unit 80 can, by means of the proper setting of the temperature control switch 90, establish and maintain the wash liquid temperature down to as low as room temperature.

Sealing of eggs in the egg basket 69 can also be accomplished by reducing the atmospheric pressure within the egg washing compartment 12. Accordingly, at the top of the egg washing compartment, there is provided a removable lid 94 with an annular gasket 96 disposed over the end of the side wall 18 to provide an airtight seal. Within the auxiliary compartment 62 there is provided a vacuum pump 98 which is also associated with the prime mover 68. A conduit 100 provided with a valve 101 is connected to the suction side of the pump and has its terminal end located, for example, in the upper portion of the wash liquid reservoir compartment 14. Although not shown, the intake end of the conduit 100 may be located in the wash compartment 12 in the top deflector baffle 40 below the lid 94. In addition although not shown, the lid 94 may be provided with a check valve which functions under normal operative conditions to prevent the ambient atmospheric pressure in the wash compartment 12 from falling below the sub-atmospheric pressure at which eggs commence to break.

Also associated with the conduit 100 is a conduit 102 located in the auxiliary compartment 62 and provided with a valve 103. When the vacuum pump 98 is used in the egg washer 10, the valve 101 of conduit 100 will usually be in open position and the valve 103 on conduit 102 will usually be closed. Both valves may be open, however, and adjusted to control the degree of vacuum in the wash compartment 12. However, if it is desired to heat-seal the eggs in the egg basket 60 without the aid of the vacuum pump but without removing the vacuum pump 98 from its association with the prime mover 68, all that need be done is to open valve 103 of conduit 102. Although not necessary in such case, unless the liquid reservoir compartment 14 is filled to capacity at the beginning of the washing operation, the valve 101 may be closed on conduit 100.

Operation

Figure 2:
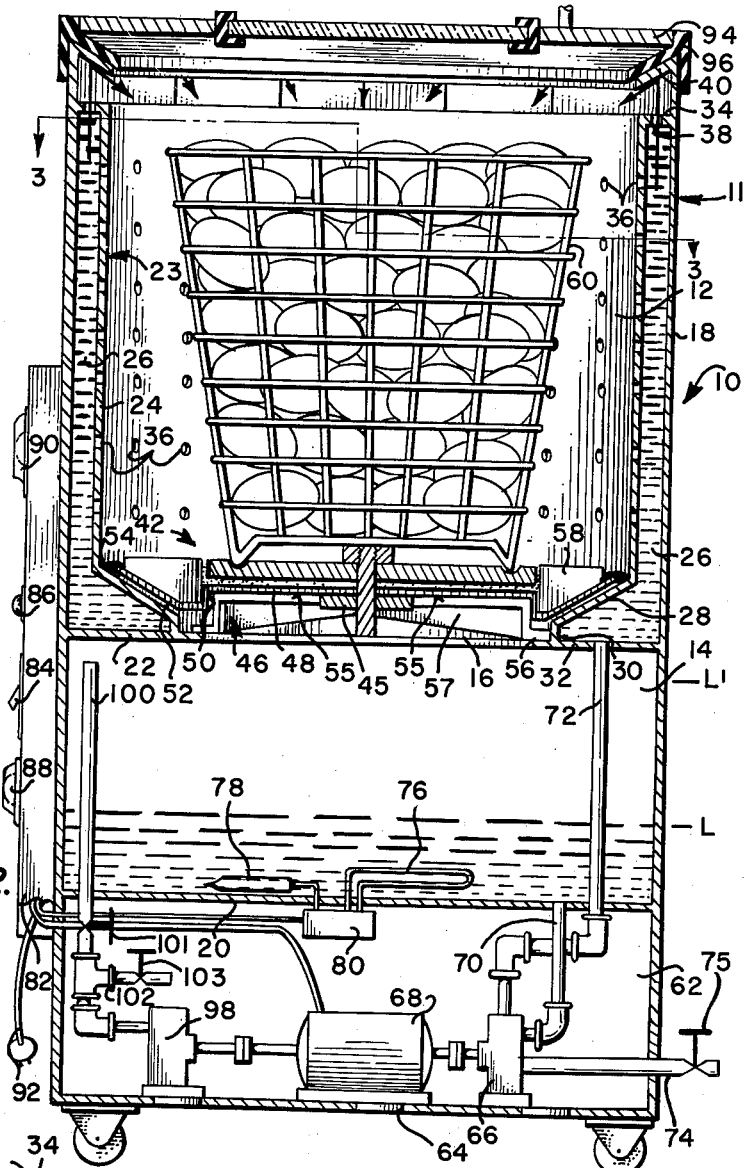
FIG. 2 is a sectional elevation along the line 2—2 of FIG. 1.

To operate the egg washer 10, the valve 75 on drain conduit 74 is closed and the wash liquid reservoir compartment 14 is charged with wash liquid as by adding a water soluble, detergent-germicide to the compartment and then introducing water. The static liquid level in the wash liquid reservoir compartment 14 should not be permitted to pass above the annular ledge 32, if heat-sealing of the eggs at atmospheric pressure is the mode of operation. Where sub-atmospheric pressure operation is to be followed, then the static, liquid level in the reservoir compartment 14 should not rise above the end of the vacuum pump conduit 100. In FIG. 2, the static, liquid level for vacuum operation is indicated by way of example by the letter L'.

The thermostatic control switch 90 is adjusted to the desired temperature of operation, the extension cord 92 is plugged into a suitable source of electric current and the on-off switch 84 is turned to the "on" position. The pilot light 86 goes on. When the liquid in the reservoir compartment 14 reaches the desired temperature for normal operative conditions, the pilot light 86 goes out. The egg basket 60 with a cluster of eggs to be washed is placed on the turntable 44 and the lid 94 is placed into position. The timer dial switch 88 is then turned to the desired wash time. This causes electrical current to be supplied to the prime mover 68. Pump 66 commences to pull wash liquid from the reservoir compartment 14 through the conduit 70 and discharge the same under hydrostatic pressure through the conduit 72 into the upflow passageway 26. As the pressure in the upflow passageway 26 builds up to the normal operative hydraulic pressure therein, wash liquid passes through the orifices 36 and through the slit-like apertures 38. The jets of liquid contact the sides of the egg basket 60 and, because of the tangential introduction of the liquid from a number of the orifices 36, the egg basket commences to rotate. The sheets of liquid emitted from the apertures 38 are deflected downwardly by the deflector baffle 40 over the entire horizontal area of the top of the revolving basket 60 containing the cluster of eggs.

By the actions of the wash liquid so induced by the construction and operation of the egg washer 10, the entire surface of each and every egg is contacted with large volumes of the wash liquid. Consequently, debris and soil thereon are loosened, removed and carried downwardly by the downflowing wash liquid within the cluster. Because of the large volumes of wash liquid involved, debris and soil in the cluster are completely washed out and downwardly to the filter screen 46. Here large particles of soil and debris, which might clog the orifices 36 and apertures 38 and which might pass therethrough and again be deposited upon the eggs in the egg basket 60, are separated from the downflowing wash liquid. Because of the special structure of the filter screen 46 and because of the vanes 58, the retained debris and soil lodge compactly between the outer portion 52 and the cylindrical portion 50 of the filter screen 46. This facilitates cleaning of the screen. The filtered wash liquid passes downwardly into the reservoir compartment 14 and is recirculated.

At the conclusion of the washing time, the prime mover 68 is turned off by operation of the timer dial switch 88. Flow of wash liquid into the wash compartment 12 ceases. Without being submerged in wash liquid, the egg basket resting on the rotatable pedestal 44 can drain. After a suitable drainage period, for example, one to two minutes being common for this apparatus, the lid 94 is removed and the egg basket 60 lifted out.

After the desired number of washing operations has been completed, the used wash liquid in the reservoir compartment 14 may be discharged from the egg washer 10 by opening the valve 75 on drain conduit 74. Where it's desired to discharge the used wash liquid into an overhead sink, a hose may be coupled onto the outlet of drain conduit 74 and the pump 66 operated.

The inside of the egg washer 10 may be readily cleaned. Indeed, it is recommended that in draining the reservoir compartment 14, the pump 66 be operated and when the pump commences to cavitate from insufficient wash liquid in the reservoir compartment 14, the valve 75 be closed and pump operation continued. The surges of wash liquid from the pump 66 through conduit 72, upflow passageway 26, the orifices 36, and apertures 38 provide an effective cleaning action. After a few moments, the prime mover 68 is turned off and the valve 75 opened. This step should be repeated with clean water. Finally, the screen and pedestal assembly 46 is lifted out and hosed down to dislodge and remove debris and soil therefrom.

From the foregoing description of structure and operation, it will be appreciated that it is important that the filter screen 46 provide a large effective screen area. The egg washer 10 is constructed to circulate wash liquid at large volume flow rates, forty gallons per minute through the pump 66 being a typical example. Wash liquid upon reaching the filter screen 46 must pass immediately therethrough. Consequently, the effective screen area must be large enough to avoid clogging by the debris and soil retained thereby and to pass wash liquid at the high volume rates involved.

It is also important that the reservoir compartment 14 be large enough to accommodate the total volume of wash liquid involved. In the typical example of a forty gallon per minute operation, the typical total volume of wash liquid in the machine may be, for example, six gallons (the circulation rate being about seven times per minute). The dynamic liquid level under normal operative conditions in the reservoir compartment 14 may be as indicated in FIG. 2 by the letter L. However, upon completion of the washing operation, the liquid level in the egg washer should not extend into the wash compartment 12.

As indicated in the foregoing, the angularly disposed orifices 36 function under normal operative conditions to direct cleaning liquid not only laterally but also tangentially to the cluster of eggs in the basket 60 whereby rotational forces are imparted to the cluster. The number and arrangement of the angularly disposed orifices 36 is sufficient to cause the cluster under normal operative conditions to slowly rotate but insufficient to cause such rapid rotation that wash liquid flowing downwardly through the cluster is thrown laterally by centrifugal force. These conditions need not be further discussed in detail because they are influenced by such things as the size and shape of the machine, which are local in nature, and because, with these conditions in mind, the number and arrangement of the angularly disposed orifices 36 can be readily ascertained by those of ordinary skill in the art.

An important feature of advantage is that the eggs washed in the machine of this invention do not have any point contact staining such as is found with eggs washed with the prior art machines. In other words, when eggs are in a cluster, the points of contact of the eggs in the cluster with each other have heretofore been apparently uneffected in prior art egg washing machines by the cleaning liquid. In the egg washer of this invention, the point contact staining is not apparent at the end of the washing operation.

A big feature of advantage of this invention is that there is no puncture breakage of eggs washed in accordance therewith and thermal breakage of eggs is minimized. Under the prior art submerged washing conditions, a substantial proportion of eggs washed thereby are found to have puncture breaks, probably due to the fact that the eggs tend to float in the wash liquid. In the method and apparatus of this invention there is no chance of the eggs floating under normal operative conditions.

Another feature of advantage of this invention is that without the vacuum pump 98 in operation, there is a small reduction in atmospheric pressure in the wash compartment 12. Apparently there is a venturi or aspirator effect in the wash compartment 12 due to the downflowing wash liquid emitted in sheets from the apertures 38 and deflector baffle 40 combination as well as by the tangential injection of the jet streams of wash liquid, thereby forming a free vortex-like pattern. This slight sub-atmospheric pressure assists in sealing of the eggs during the washing operation.

Another feature of advantage of this invention is that the egg washer may be adapted for both heat-sealing and for vacuum-sealing of the eggs. The machine may be operated solely for heat-sealing and it may be operated solely for vacuum-sealing. To operate the apparatus for vacuum-sealing regardless of whether or not heat-sealing operation is also involved, the valve 101 on the vacuum pump conduit 100 is turned on and the valve 103 on the conduit 102 is turned off. Operation of the prime mover 68 and thus of the vacuum pump 98 reduces the atmospheric pressure in the wash liquid reservoir compartment 14 and thus in the wash compartment 12.

Another feature of advantage of the machine of this invention is that it is the first machine to generally equalize washing rates throughout the mass or cluster of eggs.

Still another feature of advantage of this machine is the large volume flow rate of wash liquid throughout the cluster of eggs. This provides high velocity streams of wash liquid throughout the cluster and thereby supplies a high degree of scrubbing action. In addition, this assures removal of dirt and debris from the cluster as well as a uniform cleaning of all the eggs in the cluster.

An additional advantage of this invention is that the activity of the detergent-germicide in solution in the wash liquid appears to be prolonged. Moreover, because the eggs are not submerged in the wash liquid, it is now possible to increase the germicide concentration of the wash liquid without harmful effect to the eggs and thereby to reduce the chances of contamination from harmful microorganisms.

This invention may be embodied in several forms without departing from the spirit or essential characteristics thereof. As an example, the deflector baffle 40, instead of being an integral part of the side wall 18, may be an integral part of the gasket 96. Consequently, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. An egg washing machine comprising: a tank having a partition member between the top and bottom of said tank, said partition member dividing said tank into an upper wash compartment and a subjacent wash liquid reservoir compartment and providing a downflow passageway between said compartments; means mounted on said partition member for rotatably supporting in said upper wash compartment a perforate container for a cluster of eggs; an inner shell about the periphery of the upper wash compartment and spaced from the side wall of said tank whereby a peripheral wash liquid passageway is formed; said shell being secured to said partition member; said shell having a plurality of inwardly directed discharge orifices; a transversely disposed peripheral closure member secured to the top of said shell and to said side wall, said closure member having a plurality of spaced, apertures between the top of the shell and the side wall; above said closure member and apertures therein an inner peripheral baffle transversely disposed and adapted thereby to deflect downwardly toward the center of said wash compartment sheets of wash liquid emitted from said apertures; a pump for removing wash liquid from the bottom of said tank; and a conduit for conducting wash liquid from said pump to said peripheral wash liquid passageway; the combined areas of said orifices and said apertures being less than the discharge capacity of said pump whereby liquid is discharged from said orifices and said apertures under a positive pressure when said pump is operating.

2. An egg washing machine comprising: a circular tank having a partition member between the top and bottom of said tank, said partition member dividing said tank into an upper wash compartment and a subjacent wash liquid reservoir compartment and providing a downflow passageway between said compartments, means mounted on said partition member for rotatably supporting in said upper wash compartment a perforate container for a cluster of eggs; an inner shell about the periphery of the upper wash compartment and spaced from the side wall of said tank whereby a peripheral wash liquid passageway is formed, said shell being joined to said partition member; a plurality of orifices in said shell spaced vertically and circumferentially, said orifices being angularly disposed through said shell in the same circular direction; a transversely arranged peripheral closure member joined to the top of said shell and to said side wall; said closure member having a plurality of spaced, slit-like apertures between the top of the shell and the side wall; above said closure member and apertures therein an inner peripheral baffle transversely arranged and adapted thereby to deflect downwardly toward the center of said wash compartment sheets of wash liquid emitted from said apertures; a pump for removing wash liquid from the bottom of said tank; and a conduit for conducting wash liquid to said peripheral wash liquid passageway; the combined areas of said orifices and said apertures being less than the discharge capacity of said pump whereby liquid is discharged from said orifices and said apertures under a positive pressure when said pump is operating.

3. An egg washing machine comprising: a tank having a cylindrical side wall, a bottom and an annular partition member between the top and bottom of said tank, said partition member dividing said tank into an upper wash compartment and a subjacent wash liquid reservoir compartment and providing a central downflow passageway between said compartments; a cylindrical shell in said upper wash compartment with its axis coinciding with the axis of said side wall and spaced from said side wall whereby an annular wash liquid passageway is formed, said shell comprising a plurality of orifices tangentially disposed longitudinally and radially therein; an inwardly extending, downwardly sloping, annular shelf joined to the bottom end of said shell; a downwardly extending cylindrical member joined to the end of said shelf and to said partition member adjacent the end thereof whereby the terminal portion of said partition member forms an annular ledge; a transversely disposed annular peripheral closure member joined to the top end of said shell and to said side wall, said closure member comprising a plurality of slit-like apertures between the top of the shell and the side wall; an inwardly and downwardly extending annular deflector baffle joined to said side wall above said annular closure member and apertures therein; a turntable in said upper wash compartment centrally disposed above said downflow passageway; support means for said turntable resting on said annular ledge; filter screen means below said turntable means and covering said downflow passageway; pump means having a suction inlet and a pressure outlet; conduit means from said wash liquid reservoir compartment to said suction inlet; conduit means from said pressure outlet to said annular wash liquid passageway between said shell and said side wall; end closure means for said tank; vacuum pump means having a suction intake; and conduit means from suction intake leading to the top portion of said wash liquid reservoir compartment.

4. A method for washing eggs, which comprises: contacting said eggs with a wash liquid while said eggs are surrounded by an ambient atmosphere of reduced pressure.

5. A method for washing eggs, which comprises: placing said eggs in a cluster in a chamber; directing streams of a wash liquid toward the top end of said cluster and flowing said wash liquid through said cluster; allowing said wash liquid to drain from said cluster; recirculating collected wash liquid; and lowering the atmospheric pressure in said chamber.

6. An egg washing machine comprising: a vertically disposed tank having conduit means for liquid disposed about its side walls; said conduit means having a plurality of inwardly directed apertures for the discharge of liquid; said conduit means terminating adjacent the top of said tank and at its upper end having a plurality of upwardly discharging orifices; a downwardly inclined and inwardly extending baffle above said orifices and disposed in the path of discharge thereof; a platform mounted for free rotation in said tank concentrically thereof and adapted to support an egg basket with its sides exposed to the paths of discharge of said apertures and its top below said baffle; means for introducing washing liquid under a positive pressure to said conduit means.

7. An egg washing machine comprising: a vertically disposed tank having conduit means for liquid disposed about its side walls; said conduit means having a plurality of inwardly directed apertures for the discharge of liquid; said conduit means terminating adjacent the top of said tank and at its upper end having a plurality of upwardly discharging orifices; a downwardly inclined and inwardly extending first baffle above said orifices and disposed in the path of discharge thereof; a platform mounted for free rotation in said tank concentrically thereof and adapted to support an egg basket with its sides exposed to the paths of discharge of said apertures and its top below said first baffle; a second baffle dividing said tank into an upper washer compartment and a lower reservoir; said platform being in said washer compartment and being entirely supported by said second baffle; said second baffle having a screen for collecting solids of significant size; a pump connected to said reservoir and to said conduit means for supplying washing liquid from said reservoir to said conduit means under a positive pressure.

8. An egg washer as described in claim 7 wherein said tank has an inwardly extending shoulder; said second baffle being removably seated on said shoulder.

References Cited in the file of this patent

UNITED STATES PATENTS

| | | |
|---|---|---|
| 1,907,269 | Selmer | May 2, 1933 |
| 2,075,034 | Grace et al. | Mar. 30, 1937 |
| 2,275,411 | Ashe | Mar. 10, 1942 |
| 2,371,867 | Bayles | Mar. 20, 1945 |
| 2,471,506 | Wiswall | May 31, 1949 |
| 2,520,889 | Paden | Aug. 29, 1950 |
| 2,543,993 | Stanitz et al. | Mar. 6, 1951 |
| 2,572,983 | Burt-Wells | Oct. 30, 1951 |
| 2,576,236 | Paden | Nov. 27, 1951 |
| 2,715,408 | Stanitz et al. | Aug. 16, 1955 |
| 2,725,062 | Vile | Nov. 29, 1955 |
| 2,764,171 | Nolte | Sept. 25, 1956 |
| 2,860,646 | Zucker | Nov. 18, 1958 |

FOREIGN PATENTS

| | | |
|---|---|---|
| 624,800 | Great Britain | June 16, 1949 |

UNITED STATES PATENT OFFICE
CERTIFICATE OF CORRECTION

Patent No. 3,041,212                        June 26, 1962

William M. Booth

It is hereby certified that error appears in the above numbered patent requiring correction and that the said Letters Patent should read as corrected below.

Column 5, line 74, for "69" read -- 60 --; column 10, line 13, strike out "annular", second occurrence.

Signed and sealed this 27th day of November 1962.

SEAL)
Attest:

;TON G. JOHNSON
~~RNESK WKX SWXXER~~
Attesting Officer

DAVID L. LADD
                                         Commissioner of Patents